US007114436B1

(12) United States Patent
Mueller

(10) Patent No.: US 7,114,436 B1

(45) Date of Patent: Oct. 3, 2006

(54) SAFETY INTERLOCK AND RETRACTION MECHANISM FOR CLINCHING, CRIMPING, AND PUNCHING PRESSES

(76) Inventor: Thomas L. Mueller, 6501 River Farm Dr., St. Louis, MO (US) 63129

( * ) Notice: Subject to any disclaimer, the term of this patent is extended or adjusted under 35 U.S.C. 154(b) by 0 days.

(21) Appl. No.: 11/128,599

(22) Filed: May 13, 2005

Related U.S. Application Data

(60) Provisional application No. 60/570,764, filed on May 14, 2004.

(51) Int. Cl.
*F16P 3/00* (2006.01)
*B21D 55/00* (2006.01)

(52) U.S. Cl. ........................ 100/347; 100/35; 100/341; 100/269.02; 100/269.14; 72/3; 72/21.5; 192/130

(58) Field of Classification Search .................. 100/35, 100/269.01, 270, 269.02, 269.14, 269.15, 100/341, 342, 347, 269.16; 72/1, 3, 4, 21.2, 72/21.4, 21.5; 29/708; 192/130, 134
See application file for complete search history.

(56) References Cited

U.S. PATENT DOCUMENTS 2,222,851 A * 11/1940 MacMillin .................. 72/21.2
4,457,418 A * 7/1984 Johnston ................. 192/192 B
5,937,694 A * 8/1999 Mueller ...................... 72/452.1
6,737,765 B1 * 5/2004 Gharst ........................ 307/326

* cited by examiner

*Primary Examiner*—Lowell A. Larson
*Assistant Examiner*—Jimmy T. Nguyen
(74) *Attorney, Agent, or Firm*—Kevin L. Klug

(57) ABSTRACT

A safety interlock and retraction mechanism for all types of presses comprising a sensing or activating valve which does not apply full force to a press ram until the ram displaces to the expected work material thickness and a pneumatically operated retraction mechanism which eliminates the need for a return spring. The art differentiates between the thickness of an operator's finger relative to a work material thickness in order to promote safety. The art further provides an increased press ram force by eliminating the return spring force subtracting from the ram force.

19 Claims, 7 Drawing Sheets

SAFETY INTERLOCK AND RETRACTION MECHANISM FOR CLINCHING, CRIMPING, AND PUNCHING PRESSES

This application claims priority of U.S. Provisional Patent Application No. 60/570,764, filed May 14, 2004.

BACKGROUND OF THE INVENTION

The present invention relates in general to safety and retraction mechanisms for presses. More specifically, the mechanism of this invention represents a unique safety interlock and retraction mechanism for clinching, crimping and punching presses, especially those presses as described in U.S. Pat. No. 5,937,694 issued to Mueller on Aug. 17, 1999. The aforesaid U.S. Pat. No. 5,937,694 issued to Mueller is hereby incorporated by reference. Many prior art presses as described in Mueller utilize one or more return springs to retract the ram from the work material and do not offer a safety interlock mechanism. When the aforesaid return spring(s) is used, the actuator must present a force upon the cams and cam rollers greater than the compressed spring force in order to actuate the ram toward the work material. Unfortunately, this results in less force upon the work material since the spring force must be overcome. Utilization of a return spring further limits the ram displacement due to the limitation on spring length within the fixed size frame and may also limit the ram retraction rate.

The present art represents an air cylinder retraction mechanism which eliminates the requirement for a return spring and further provides an interlock feature which prohibits full force actuation unless the desired work material having a predetermined thickness range is placed between a punch and die of the press. That is, the present art utilizes one or more pneumatic actuators having an internal return mechanism or spring and a pneumatic valve which allows only a nominal pneumatic actuator return force application to the ram unless the ram displacement is sufficient to indicate that a thinner or predetermined thickness of work material is between the punch and die and not a thicker material such as an operator's finger.

Accordingly, it is an object of the present invention to provide a press retraction mechanism apparatus and method of use which ensures safety and eliminates the need for a return spring to retract the ram from the work material.

Another object of the present invention is to provide a safety interlock apparatus and method of use which prohibits full force actuation of the press unless a predetermined thickness range of desired work material is placed between a punch and die of the press.

A further object of the present invention is to provide a safety interlock and retraction mechanism apparatus and method of use which provides an increased force upon the work material due to the absence of a counteracting return spring force.

A yet further object of the present invention is to provide a safety interlock and retraction mechanism apparatus and method of use which does not suffer the prior art limitations of ram displacement.

SUMMARY OF THE INVENTION

To accomplish the foregoing and other objects of this invention there is provided a safety interlock and retraction mechanism for presses in general and specifically clinching, crimping and punching presses. The safety interlock and retraction mechanism comprises one or more pneumatic cylinders attached to the press; a control valve, an activating valve having two or more ports and an activating button; and an air piloted valve capable of directing pneumatic air flow such that full force actuation is prohibited unless the work material has a predetermined thickness range, thereby allowing activation of the pneumatic valve. Preferably, the safety interlock and retraction mechanism is attached to a pneumatic press such that an existing shop air supply, existing air stroke actuator or air bag, and existing foot operated multiport pneumatic valve can be utilized and incorporated into the present safety interlock and retraction mechanism.

In the preferred embodiment, the one or more pneumatic cylinders have a housing and a spring biased extension rod. The housing of the one or more pneumatic cylinders attaches intermediate the existing ram and cam roller housing; and the extension rod attaches through a plate to the frame of the press.

The one or more pneumatic cylinders are pneumatically connected such that when the existing foot operated pneumatic valve is depressed, the pressurized air supply to the one or more cylinders is essentially eliminated. This allows the spring biased extension rods to retract and allows the ram to partially close under only the force of the one or more cylinder spring biases. If the work material is within a predetermined thickness range, mechanical depression of the activating button of the pneumatic valve occurs and activates the humphrey or air piloted valve. Once activated, the air piloted valve allows compressed air flow to the air stroke actuator for full force activation.

BRIEF DESCRIPTION OF THE DRAWINGS

Numerous other objects, features, and advantages of the invention should now become apparent upon a reading of the following detailed description taken in conjunction with the accompanying drawings, in which.

DETAILED DESCRIPTION

Figure 1A:
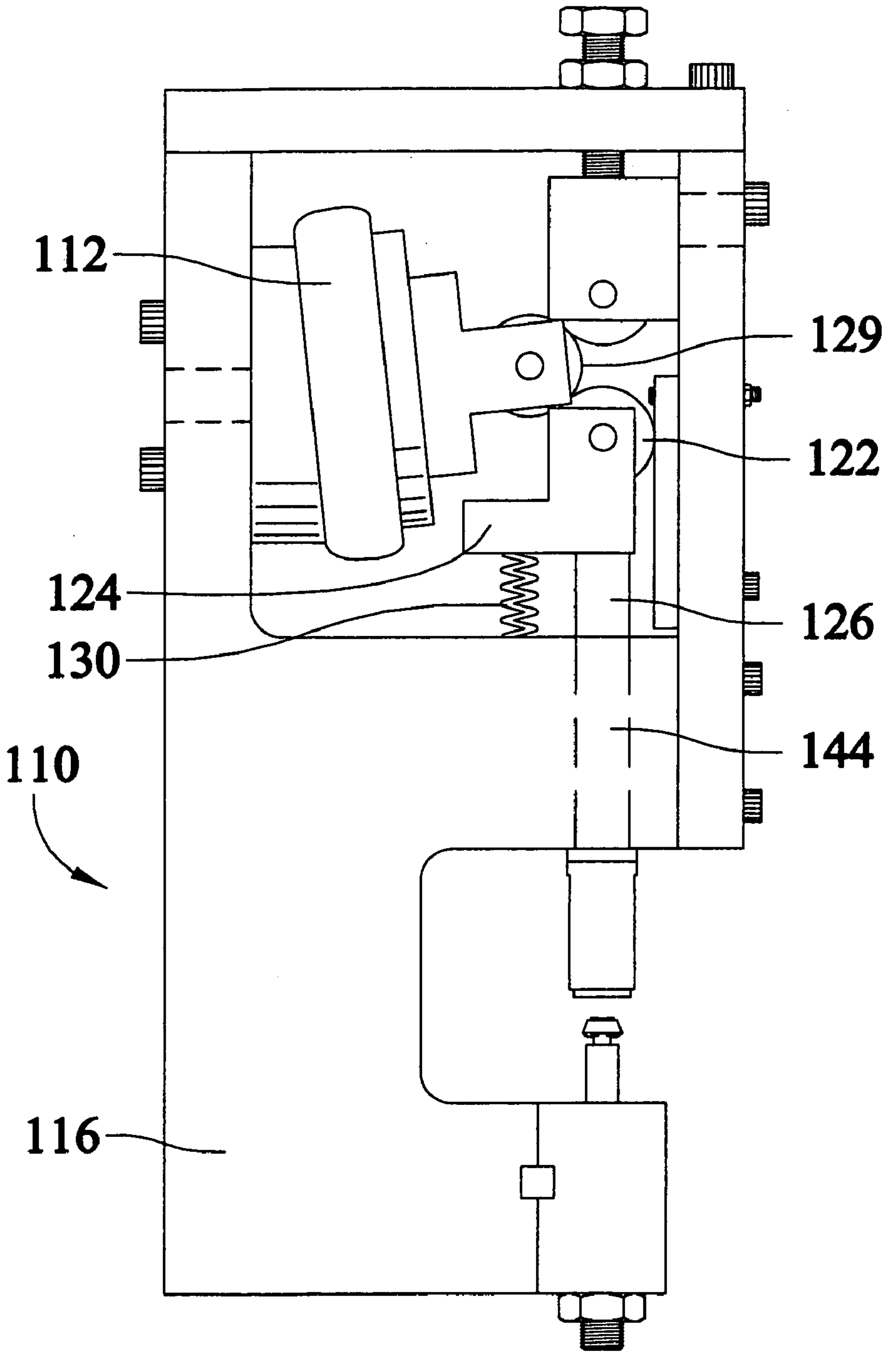
FIG. 1A PRIOR ART
FIG. 1A is a right side plan view of the prior art Mueller improved clinching, crimping and punching press with the ram in an open position and the air stroke actuator unpressurized. The right side plan view is symmetric with the left side plan view.

Referring now to the drawings, a preferred embodiment of the safety interlock and retraction mechanism for clinching, crimping and punching presses is shown in FIGS. 1A–7. The safety interlock and retraction mechanism 10 is described in conjunction with a prior art pneumatic press

110 for clinching, crimping and punching including but not limited to that described in U.S. Pat. No. 5,937,694 issued to Mueller on Aug. 17, 1999. The present art is also usable with and for other types of presses, including but not limited to hydraulic, electric, or mechanically actuated presses.

Figure 1B:
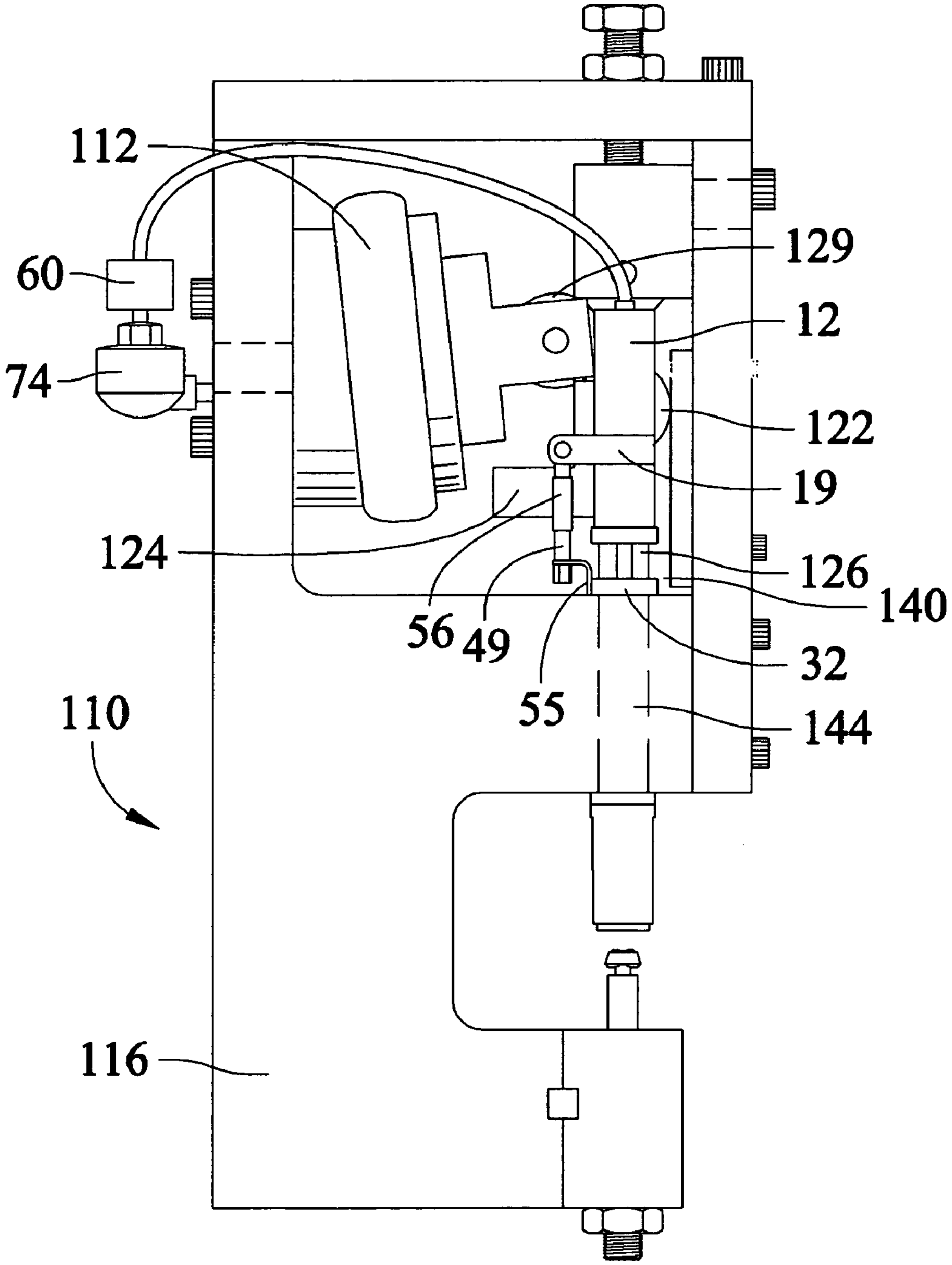
FIG. 1B is a right side plan view of the prior art Mueller improved clinching, crimping and punching press with the present art safety interlock and retraction mechanism.
Figure 2:
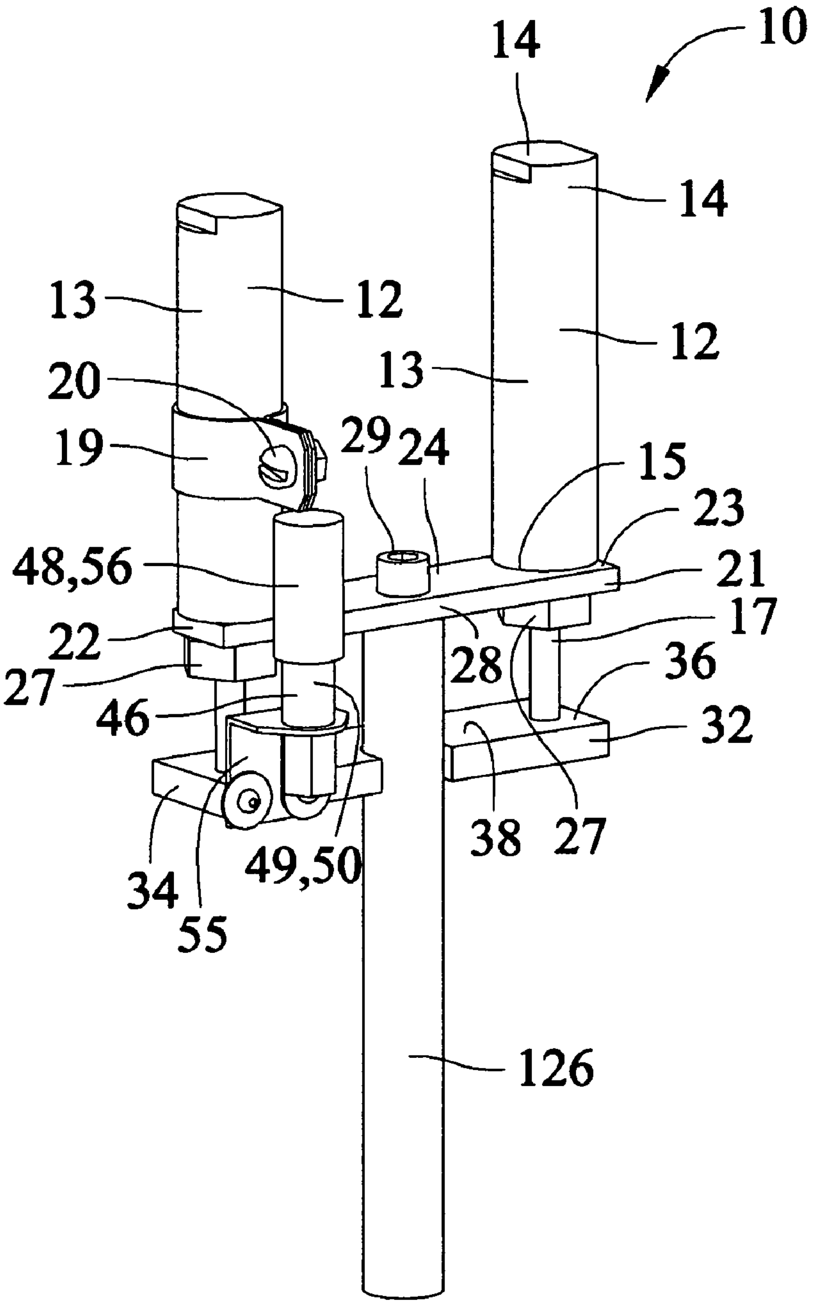
FIG. 2 shows a perspective view of the safety interlock and retraction mechanism with attached ram.
Figure 3:
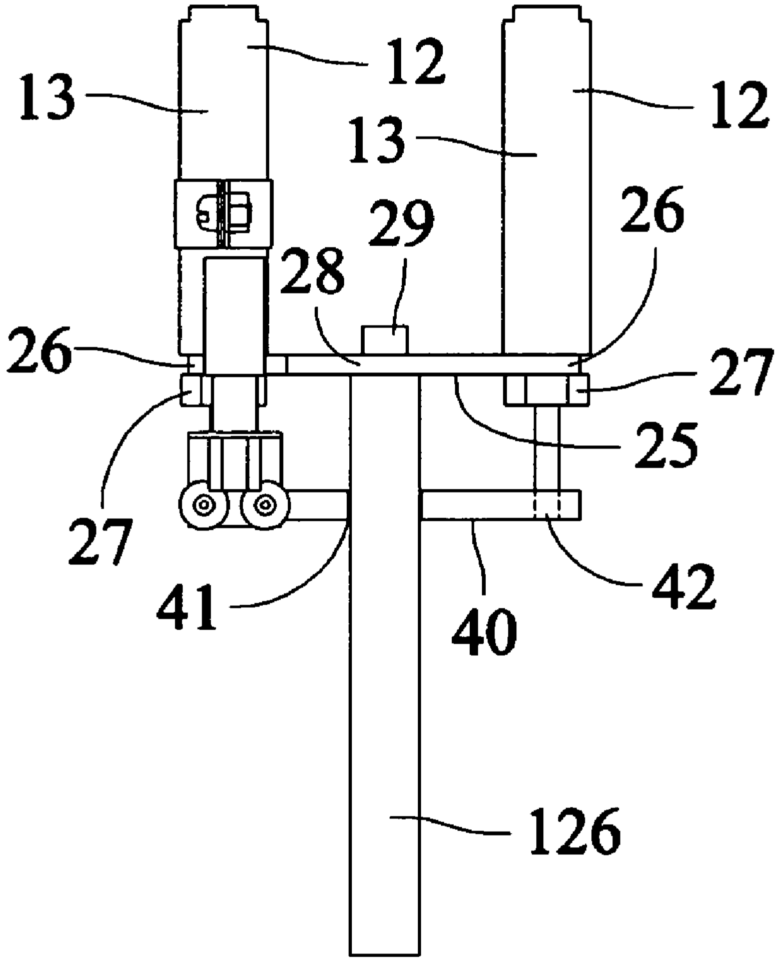
FIG. 3 shows a front side plan view of the safety interlock and retraction mechanism with attached ram.
Figure 4:
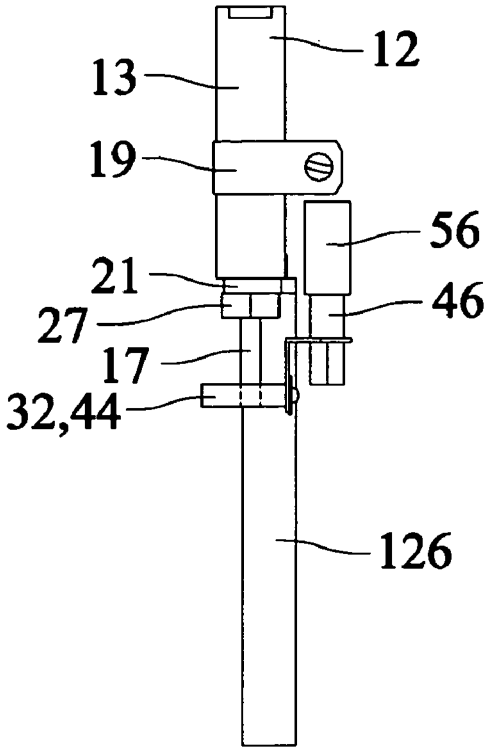
FIG. 4 shows a left side plan view of the safety interlock and retraction mechanism with attached ram.
Figure 5:
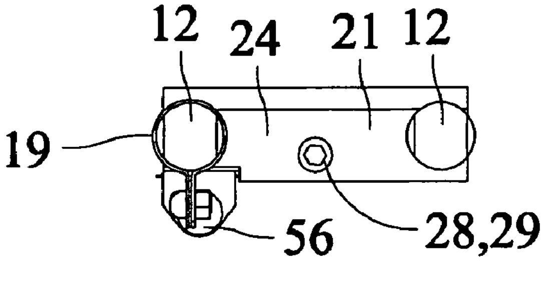
FIG. 5 shows a top side plan view of the safety interlock and retraction mechanism with attached ram.
Figure 6:
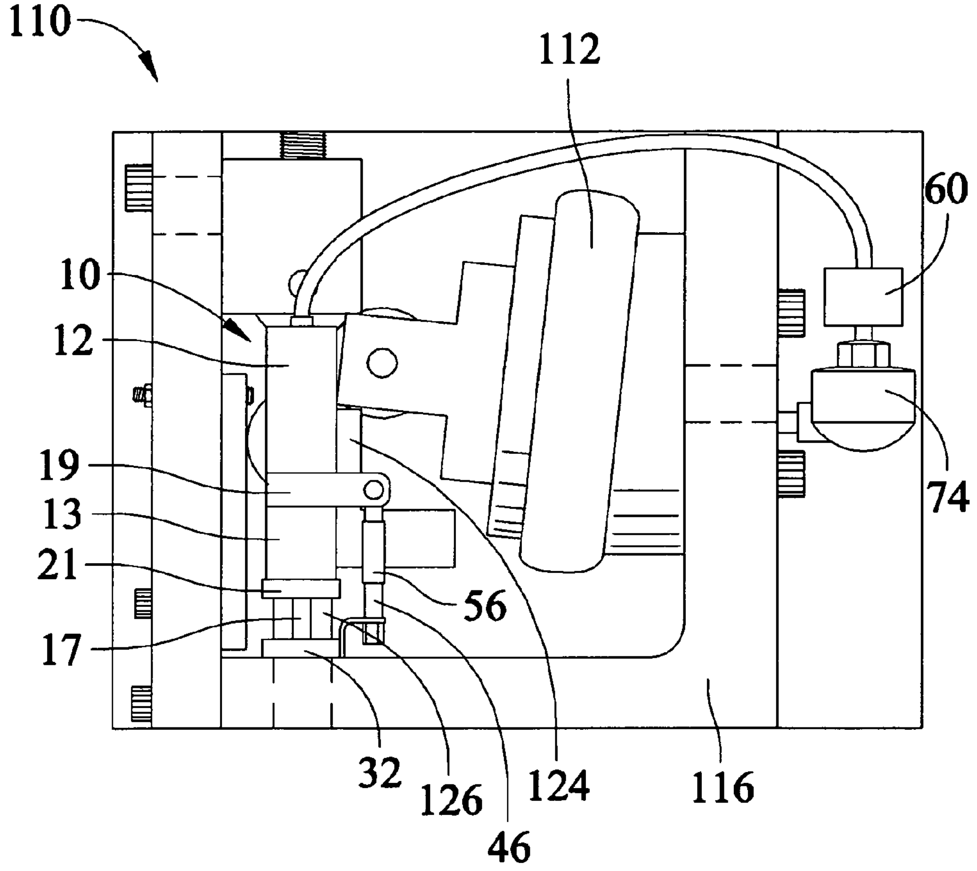
FIG. 6 shows an assembled left side perspective view of the safety interlock and retraction mechanism attached with the ram and press of Mueller.
Figure 7:
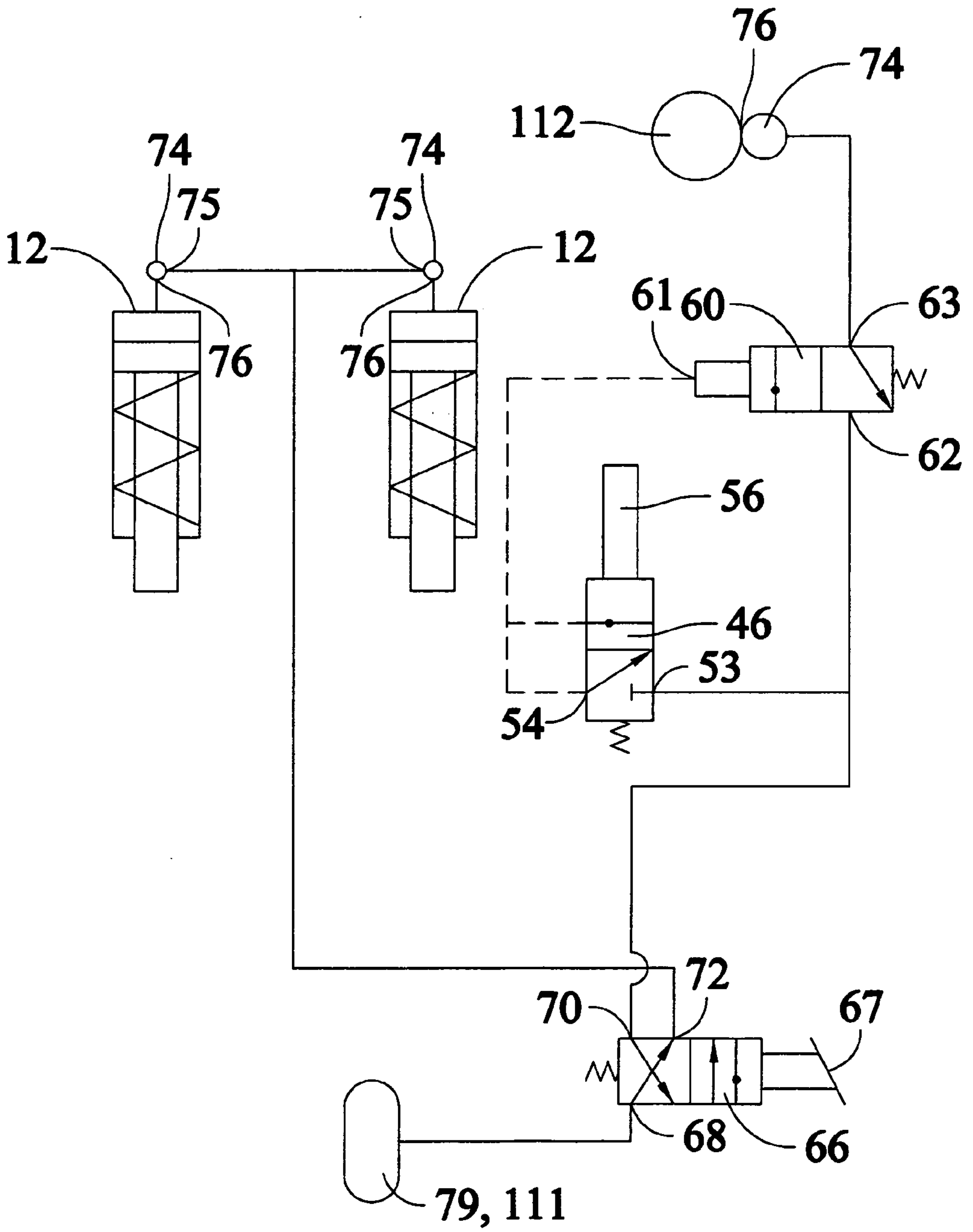
FIG. 7 shows a pneumatic schematic diagram of the pneumatic supply to the valves, cylinders, air stroke actuator (air bag), and other components. Equivalent parts listed may be substituted from other manufacturers.

FIG. 1B of the drawings, shows the safety interlock and retraction mechanism 10 for clinching, crimping, and punching presses in combination with the prior art pneumatic press 110 of Mueller. The safety interlock and retraction mechanism 10 of the present invention is preferably interconnected with the pneumatic system of the prior art pneumatic press 110 and operates pneumatically. Alternative embodiments may utilize hydraulic, electrical, or mechanical techniques to operate the present art apparatus 10. The pneumatic system of the prior art, in part, primarily consists of a pneumatic air supply 111, an air stroke actuator 112 or air bag, a pneumatic valve 66 with a foot operated lever 67, such as a Numatic® model NAM500100 or its equivalent. The air stroke actuator 112 when fully activated moves a rolling cam 129 which in turn moves a second cam roller 122 connected to a cam roller housing 124 and a ram 126.

The safety interlock and retraction mechanism 10 comprises one or more pneumatic actuators or cylinders 12 attached with the pneumatic press 110; a push button pneumatic actuating valve 46 having at least a first port 53, a second port 54, and an activating button 48; and an air piloted valve 60 having at least a first port 62, a second port 63, and an actuating port 61 which are all controlled by a control valve 66. The air piloted valve 60 in conjunction with said pneumatic activating valve 46 is capable of directing pneumatic air flow such that full force actuation is prohibited unless the work material is within a predetermined thickness range. That is, if the internal biasing of the pneumatic actuators or cylinders 12 moves the press ram 126 sufficiently to activate said activating valve 46, said air piloted valve 60 is activated and full pneumatic pressure is supplied to said air stroke actuator 112.

The one or more pneumatic actuators or cylinders 12 preferably have a housing 13 with a first end 14 and a second end 15, and a spring biased extension rod 17. The housing(s) 13 of the one or more pneumatic cylinders 12 preferably attach intermediate the ram 126 and the cam roller housing 124 and the extension rod 17 attaches to a frame 116 of the press 110.

The one or more pneumatic cylinders 12 are activated or pneumatically connected when the foot operated pneumatic valve 66 is depressed. The pneumatic supply 111 to the one or more cylinders 12 is essentially eliminated when foot operated pneumatic valve 66 is released. This causes the spring biased extension rods 17 to retract and thereby allows the ram 126 to partially close under only the force of the one or more cylinders 12 spring bias. If the work material is within the predetermined thickness range, thereby allowing mechanical depression of the activating button 48 of the pneumatic activating valve 46, the air piloted valve 60 allows compressed air to flow to the air stroke actuator 112 for full force activation.

In a preferred embodiment, the present art first comprises two pneumatic cylinders 12, each preferably a Bimba® model 092 and/or a Clippard®model SSR-17-2 or their equivalents. Alternative embodiments may utilize one or more than two of the aforesaid cylinders 12. The preferred embodiment further comprises a ram mounting plate 21 having a first end 22 and second end 23, a topside 24, and a bottomside 25. The second end 23 of the housing 13 of each of the one or more pneumatic cylinders 12 is mounted onto said ram mounting plate 21, preferably at or near said first end 22 and said second end 23 and onto said topside 24. Said housing 13 of said one or more pneumatic cylinders 12 is preferably mounted through holes 26 within said plate 21 via threads and nuts 29 on said housings 13 but may be mounted with alternative means including but not limited to brackets, bolts, rivets, welds, or screws. The ram mounting plate 21 is preferably mounted onto the press 110 between the cam roller housing 124 as described in Mueller and the ram 126 as also described in Mueller. Preferably said ram mounting plate 21 mounting is via a hole 28 in said ram mounting plate 21 through which a bolt attaches into or through said cam roller housing 124 and through said ram mounting plate 21 and thereafter engages threads within said ram 126 to form a sandwich. That is, said ram mounting plate 21 is sandwiched between said cam roller housing 124 and said ram 126. Alternative embodiments may attach the ram mounting plate 21 to said ram 126 or cam roller housing 124 via a plurality of means including but not limited to brackets, bolts, rivets, welds, or screws, provided said plate 21 displaces with said ram.

Each of said one or more pneumatic cylinders 12 has an extension rod 17 which extends from the second end 15 of each cylinder housing 13 when each of the one or more pneumatic cylinders 12 is pneumatically activated or pressurized. In a preferred embodiment, said extension rods 17 are at least partially threaded for attachment to a frame plate 32, near or at a first end 34 or a second end 36 of said frame plate 32. Alternative embodiments could attach said extension rods 17 to the frame plate 32 in a plurality of ways, including but not limited to brackets, bolts, rivets, welds, or screws.

The frame plate 32 has a top side 38, bottom side 40, a first end 34, a second end 36, and in a preferred embodiment one or more threaded holes 42 near said first end 34 or said second end 36 for mounting said extension rods 17. Alternative embodiments may attach said extension rods 17 to said frame plate 32 with a plurality of means including but not limited to brackets, bolts, rivets, welds, or screws. The frame plate 32 preferably mounts onto or with the frame 116 as described in Mueller near the intersection of the ram 126 and the bored hole 144 of Mueller with said bottom side 40 resting on the press frame 116 within the first opening 140. Typically this is with threaded fasteners 29 through one or more holes 44 through said frame plate 32 and into said frame 116. The frame plate 32 serves as a substantially non-moving mounting platform for the safety interlock and retraction mechanism 10. In a preferred embodiment, said frame plate 32 is held via one or more bolts, preferably two, which are threaded through said frame 116 and mechanically bind over said top side 38 of the frame mounting plate 32. Also in a preferred embodiment, the frame plate 32 has a notched portion 41 through which the ram 126 is able to clear and extend. Alternative embodiments may forego use of said notched portion 41 for ram clearance and instead shape and position the frame plate 32 in a manner which will not interfere with ram 126 movement. Alternative embodiments may further attach the frame plate 32 in a plurality of rigid or floating ways including but not limited to brackets, bolts, rivets, welds, or screws.

Onto the frame plate 32 is attached a push button pneumatic activating valve 46, preferably a Pneumadyne® model C021605 or equivalent, which extends away from the top side 38 of the frame plate 32 toward or parallel with the housing 13 of one of the one or more pneumatic cylinders 12. Said pneumatic valve 46 has a valve body 49 and button end 50 with an activating button 48, said activating button 48 serving as the actuating portion of the pneumatic valve 46. When mounted, the button end 50 preferably extends toward or parallel with the housing 13 of one of the one or more pneumatic cylinders 12. Preferably the pneumatic valve 46 is mounted with a small "L-shaped" bracket 55 onto the frame plate 32 and further has an attached overstroke operator 56 such as a Pneumadyne® model POSA or equivalent attached onto the button end of the pneumatic valve. The overstroke operator 56 or actuator is understood by one skilled in the art as a spring loaded attachment which allows activation of the pneumatic valve 46 activating button 48 and further allows continued displacement against its spring loading. Typically the continued displacement or overstroke is approximately 0.73 inches yet may vary in alternative embodiments. It is important to note that alternative embodiments may position the valve activating button 50 such that utilization of the overstroke operator 56 is not required or position the pneumatic valve 46 in a plurality of positions on or off of the frame 116 of the press 110 in Mueller.

The push button pneumatic valve 46 typically has two ports, a first port 53 which is normally closed and a second port 54 which is vented to atmosphere when the pneumatic valve 46 is not actuated. Upon actuation or activation, by pressing the activating button 48, the pneumatic valve 46 forms a continuous pneumatic path between the first port 53 and the second port 54 without atmospheric venting.

In the preferred embodiment, the overstroke operator 56 touches with a clamp 19 or arm extending from the housing 13 of said one of the one or more pneumatic cylinders 12 when the cylinder extension rods 17 are retracted. This clamp 19 or arm thereby actuates the pneumatic valve 46 and creates a continuous pneumatic path between the first port 53 and the second port 54 without atmospheric venting. Said clamp or arm 19 may also extend from components attached to said ram 126 such as the ram mounting plate 21 or the ram 126 itself.

In the preferred embodiment, the second port 54 of the pneumatic valve 46 is connected to an air piloted valve 60; preferably a three way air pilot operated valve by Humphrey® with model number 250A31020 or equivalent (hereafter a humphrey valve), and the first port 53 is connected to the pneumatic supply 111 through a second port 72 of a pneumatic footswitch control valve 66. That is, when the foot operated lever 67 or footwitch control valve 66, is depressed, a pressurized pneumatic supply 111 is provided to the first port of the pneumatic valve 46. Unless the pneumatic valve 46 is actuated via the clamp or arm 19 extending from the housing 13 of said one of the one or more pneumatic cylinders 12, the compressed air supply 111 cannot flow to an actuating port 61 of the air piloted valve 60 (humphrey valve). The air piloted valve 60 (humphrey valve) is understood by those skilled in the art as a pneumatically actuated valve. The air piloted valve 60 (humphrey valve) has an actuating port 61, a first input port 62, and a second output port 63. Unless compressed air is supplied to the actuating port 61, the first input port 62 is closed and the second output port 63 is vented to atmosphere. When compressed air is supplied to the actuating port 61, the first input port 62 and the second output port 63 forms a continuous pneumatic path between the first input port 62 and the second output port 63 without atmospheric venting. In the preferred embodiment, the same pneumatic or air supply 111 from the footswitch pneumatic valve 66 having with the foot operated lever 67 is connected with the first port 53 of the pneumatic valve 46 and is also connected with the first input port 62 of the air piloted valve 60 (humphrey valve). The second output port 63 of the air piloted valve 60 (humphrey valve) is connected with the air stroke actuator 112 or air bag of the Mueller press 110 or equivalent. Thus, upon activation of the foot operated lever 67, compressed air cannot be supplied to the air stroke actuator 112 or air bag unless the pneumatic valve 46 is actuated via the clamp or arm 19 extending from a housing 13 of the one or more pneumatic cylinders 12. This assures that the ram 126 reaches or creates a distance between the ram 126 punch and die which clearly indicates that a thin sheet metal workpiece or equivalent predetermined material thickness is between the ram 126 punch and die rather than a thicker object such as an operator's finger, before the air stroke actuator 112 or air bag is pressurized.

The footswitch pneumatic control valve 66 contains an input pneumatic pressurization port 68, a first output port 70, a second output port 72, and a foot operated lever 67. Each output port 70, 72 is alternatively vented to atmosphere or connected with said input port 68 depending on whether the foot operated lever 67 is depressed. That is, when the foot operated lever 67 is not depressed, compressed air flows out of the second output port 72 to the one or more pneumatic cylinders 12, thereby causing said extension rods 17 to extend. Extension of said extension rods 17 forces quick retraction of the press ram 126. When the foot operated lever 67 is depressed, the one or more pneumatic cylinders 12 are vented to atmosphere and the pneumatic activating valve's 46 first port 53 and the air piloted valve's 60 (humphrey valve) first input port 62 are supplied with compressed air from the first output port 70 of the pneumatic control valve 66. Since the extension rods 17 of the one or more pneumatic cylinders 12 are biased to retract, typically with spring loading, the ram 126 begins movement thereby moving the punch and die closer. This occurs since the ram mounting plate 21 is attached with the ram 126 and the frame plate 32 is held with the frame 116 as aforedescribed. Thus, the only force upon the ram 126 is the return mechanism or springs of the one or more pneumatic cylinders 12 until such time as the pneumatic activating valve 46 allows the air piloted valve 60 (Humphrey valve) to supply pneumatic pressure to the air stroke actuator or air bag 112. Moreover, until the pneumatic activating valve 46 is actuated via engagement with the clamp or arm 19 extending from a housing 13 of said one or more pneumatic cylinders 12, compressed air is not supplied to the air stroke actuator or air bag 112. This assures that dangerous levels of force are not applied to the punch and die combination until the ram 126 is displaced sufficiently to indicate that an operator's finger is not present.

The clamp or arm 19 extending from the housing 13 of said one or more pneumatic cylinders 12 is typically adjustable in elevation via a setscrew or clamping bolt 20. This provides a method by which the operator may adjustably obtain an optimum distance between the punch and die before maximum force is applied to the ram 126.

Although description of the pneumatic schematic has been provided in conjunction with the aforesaid mechanical components, description of the pneumatic interconnections is desirable for clarity. As seen in the figures, a pneumatic compressed air supply 79 is provided to a pneumatic control valve 66 which feeds said compressed air supply 79 to the press 110 and safety interlock and retraction mechanism 10. The first output port 70 of the pneumatic control valve 66 vents the pneumatic line feeding the pneumatic activating valve 46 and the air piloted valve 60 (Humphrey valve) when the foot operated lever 67 is not depressed. The second output port 72 of the pneumatic control valve 66 also connects the pneumatic supply 79 to the line feeding the one or more pneumatic cylinders 12 when the the foot operated lever 67 is not depressed. This assures that the extension rods 17 from the one or more pneumatic cylinders 12 extend and thereby raise the ram 126 when the foot operated lever 67 is not depressed. That is, instead of utilizing springs to return the ram 126 after a clinching, crimping, or punching operation, the ram 126 is returned or retracted via the force of the one or more pneumatic cylinders 12.

When the foot operated lever 67 is depressed, the second output port 72 is vented to atmosphere and the first output port 70 is connected with the pneumatic supply 111 thereby feeding the pneumatic valve 46 and the air piloted valve 60 (Humphrey valve). Until and unless the biased retraction mechanism or springs of the one or more pneumatic cylinders 12 move the ram 126 sufficiently toward the work material whereby the arm 19 may activate the pneumatic activating valve 46 thereby activating the air piloted valve 60 (Humphrey valve), the compressed air supply 111 is withheld from the air stroke actuator 112 or air bag. That is, the second output port 63 of the air piloted valve 60 (Humphrey valve) is connected with said air stroke actuator 112. As aforesaid, sufficient force for crimping, clinching, and punching cannot be provided until said air stroke actuator 112 is pressurized via activation of the air piloted valve 60 (Humphrey valve).

Included within the present art apparatus 10 alternative embodiments are one or more quick exhaust valves 74. In the preferred embodiment, three quick exhaust valves 74 are used. One quick exhaust valve 74, preferably by Humphrey® with model number QE2 or equivalent, is pneumatically connected near the air stroke actuator or air bag 112. The remaining two quick exhaust valves 74, preferably by Clippard® with model number JEVF-2F2 or equivalent, are pneumatically connected near each of the two pneumatic actuators or air cylinders 12 of the preferred embodiment. A quick exhaust valve 74 typically has an input port 75 and an output port 76. When the input port 75 is pressurized, a connection is formed between the input port 75 and output port 76. When the input port 75 is vented to atmosphere, the output port 76 is also vented to atmosphere at the location of the quick exhaust valve 74 and not only through the input port 75. The pneumatic schematic diagram shows inline pneumatic placement of the one or more quick exhaust valves 74 within the lines feeding each of the air cylinders 12 and the line feeding the air stroke actuator or air bag 112. Utilization of the quick exhaust valves 74 assures quick venting of the aforesaid components, thereby allowing for faster operation of the present art.

In operation, a user or technician first adjusts the arm or clamp 19 location for the thickness of work material to be utilized. The user then places a work material between the punch and die of the press 110 and depresses the foot operated lever 67. The biased return mechanism within the one or more pneumatic cylinders 12 forces the ram 126 to move the punch and die towards each other. When the ram 126 displacement is sufficient to indicate that a proper thickness work material is present, the pneumatic valve 46 actuates the air piloted valve 60 (Humphrey valve), thereby providing compressed air to the air stroke actuator 112. Upon activation of the air stroke actuator 112, full press force is applied to the punch and die. Upon user release of the foot operated lever 67, the air piloted valve 60 (Humphrey valve) is deactivated, the air stroke actuator or air bag 112 is vented to atmosphere, and the one or more pneumatic cylinders 12 are pressurized, thereby quickly retracting the ram 126.

For all of the aforesaid pneumatic devices, a pneumatic source 79 is presumed available and able to feed each of the aforesaid components. The aforesaid press 110 and frame 116 as described in Mueller and associated components may be manufactured from a variety of materials including but not limited to metals and alloys thereof, plastics, and composites. Where described, part numbers and manufacturer's names are included for informational and enablement purposes only. Other substantially equivalent brand and part numbers may be substituted without departing from the scope and spirit of the present application. This includes but is not limited to substitution of manual, electronic, hydraulic, or pneumatically controlled components and control valves for the pneumatic control valve 66 and other pneumatic components. As understood within the art, when a port or output of an element is activated, a supply of compressed air, hydraulic fluid, electrical energy, or mechanical force is supplied from said element. This supply is dependent upon whether the valve or actuator is designed for compressed air, hydraulic fluid, electrical energy, or mechanical force respectively. Combinational valves including but not limited to electro-pneumatic and electro-hydraulic valves may further be utilized within the present art.

From the foregoing description those skilled in the art will appreciate that all objects of the present invention are realized. A safety interlock and retraction mechanism 10 apparatus and method of use has been shown and described. The apparatus and method of use provides a safety interlock which prohibits full force actuation of the press unless the desired work material having a predetermined thickness range is placed between a punch and die of the press. This feature is especially useful for distinguishing between a work material and an operators finger. The apparatus and method of use also provides a press retraction mechanism which eliminates the need for a return spring for ram retraction from the work material thereby providing more force and ram displacement onto and at the work material.

The preferred design of the present invention as well as alterations that will now be apparent to those skilled in the art all allow use of the safety interlock and retraction mechanism with any press. The present invention and the alternative embodiments, are available in and adaptable to a variety of shapes, forms, and sizes.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. A safety interlock and retraction apparatus for presses, comprising;

one or more actuators connected between a frame of a press and a ram of said press, said press having a stroke actuator; and a control valve having a first output port and a second output port, said second output port connected with said actuators; and an activating valve having a first port and a second port and positioned with said press to substantially activate said activating valve second port when said ram reaches a predetermined position toward a work material and said first port is activated via said first output port of said control valve; and a piloted valve having an actuating port connected with said second port of said activating valve, a first input port connected with said first output port of said control valve, and a second output port connected with said stroke actuator; and an arm positioned to activate said activating valve when said ram moves sufficiently toward the work material; and whereby said one or more actuators cause said ram to retract when said second output port of said control valve is activated and allow said ram to displace toward said work material when said second output port of said control valve is not activated; and said stroke actuator further causing said ram to move toward said work material with full force only when said first output port of said control valve is activated and said second port of said activating valve is activated due to said ram reaching said predetermined position toward said work material.

2. The safety interlock and retraction apparatus for presses as set forth in claim 1 whereby:

said one or more actuators are pneumatic actuators; and said control valve is a pneumatic control valve having a pneumatic source connected with a pressurization port; and said activating valve is a pneumatic activating valve; and said piloted valve is pneumatic air piloted valve; and said stroke actuator is a pneumatic air stroke actuator.

3. The safety interlock and retraction apparatus for presses as set forth in claim 2 further comprising:

a ram mounting plate connected with said ram and a frame plate connected with a frame of said press; and said one or more actuators, each having a housing; and said one or more actuators, each having an extension rod; and said housing connected with said ram mounting plate or said frame plate exclusive of said one or more extension rod; and said extension rod connected with said ram mounting plate or said frame plate exclusive of said housing.

4. The safety interlock and retraction apparatus for presses as set forth in claim 3 further comprising:

said arm connected with said ram mounting plate or said one or more actuators or said ram and positioned to cause depression of an activating button of said pneumatic activating valve and activate said pneumatic activating valve when said work material is within a predetermined thickness range.

5. The safety interlock and retraction apparatus for presses as set forth in claim 4 further comprising:

an overstroke operator between said activating button and said pneumatic activating valve whereby said pneumatic activating valve may be activated by said arm and said arm may have continued displacement.

6. The safety interlock and retraction apparatus for presses as set forth in claim 5 further comprising:

one or more quick exhaust valves connected between said actuators and said control valve or between said second output port of said piloted valve and said stroke actuator.

7. The safety interlock and retraction apparatus for presses as set forth in claim 3 whereby:

said actuators are biased to retract when not activated by said second port of said control valve and thereby displace said ram toward said work material.

8. The safety interlock and retraction apparatus for presses as set forth in claim 1 whereby:

said control valve first output port is activated when said control valve second output port is deactivated and said first output port is deactivated when said second control valve output port is activated.

9. The safety interlock and retraction apparatus for presses as set forth in claim 2 whereby:

said control valve first output port is activated when said second output port is deactivated and said first output port is deactivated when said second output port is activated; and one or both of said first and second output ports are vented when deactivated and connected with said pneumatic source when activated; and said second port of said activating valve is vented when said activating valve is not activated.

10. The safety interlock and retraction apparatus for presses as set forth in claim 9 further comprising:

a ram mounting plate connected with said ram and a frame plate connected with a frame of said press; and said one or more actuators, each having a housing; and said one or more actuators, each having an extension rod; and said housing connected with said ram mounting plate or said frame plate exclusive of said extension rod; and said one or more extension rods biased to retract and connected with said ram mounting plate or said frame plate exclusive of said housing; and said arm connected with said ram mounting plate or said one or more actuators and positioned to cause depression of an activating button of said pneumatic activating valve and activate said pneumatic activating valve when said work material is within a predetermined thickness range.

11. The safety interlock and retraction apparatus for presses as set forth in claim 10 whereby:

said activating valve is connected with said frame or frame plate via a mounting bracket; and said pneumatic control valve is foot operated.

12. The safety interlock and retraction apparatus for presses as set forth in claim 9 further comprising:

a ram mounting plate connected with said ram and a frame plate connected with a frame of said press; and said one or more actuators, each having a housing; and said one or more actuators, each having an extension rod; and said housing connected with said ram mounting plate; and said extension rod biased to retract and connected with said frame plate; and said arm connected with said one or more actuators and positioned to cause depression of an activating button of said pneumatic activating valve and activate said pneumatic activating valve when said work material is within a predetermined thickness range.

13. The safety interlock and retraction apparatus for presses as set forth in claim 1 further comprising:

a ram mounting plate connected with said ram and a frame plate connected with a frame of said press; and said one or more actuators, each having a housing; and said one or more actuators, each having an extension rod; and said housing connected with said ram mounting plate; and said extension rod biased to retract and connected with said frame plate; and said arm connected with said one or more actuators and positioned to cause depression of an activating button of said activating valve and activate said activating valve when said work material is within a predetermined thickness range.

14. A safety interlock and retraction apparatus for presses comprising:

a pneumatic control valve having a first output port, a second output port, and a pressurization port whereby said first output port is pressurized from said pressurization port when said pneumatic control valve is activated and vented when not activated and said second output port is pressurized from said pressurization port when said pneumatic control valve is not activated and vented when activated; and one or more pneumatic actuators connected with said second output port of said pneumatic control valve and attached and positioned with said press whereby a actuators cause a ram of said press to retract when compressed air is supplied from said second output port of said pneumatic control valve; and a pneumatic activating valve having a first port connected with said first output port of said control valve and a second port which connects with said first port when said pneumatic activating valve is activated and vents when said pneumatic activating valve is not activated, said pneumatic activating valve positioned to activate when said ram moves sufficiently toward a work material; and an air piloted valve having an actuating port connected with said second port of said pneumatic activating valve, a first input port connected with said first output port of said pneumatic control valve, and a second output port connected with an air stroke actuator of said press, whereby activation of said pneumatic control valve depressurizes said one or more pneumatic actuators and pressurizes said air stroke actuator when said pneumatic activating valve is activated; and an arm positioned to activate said pneumatic activating valve when said ram moves sufficiently toward the work material.

15. The safety interlock and retraction apparatus for presses as set forth in claim 14 whereby:

said one or more pneumatic actuators each have a housing and an extension rod; and a ram mounting plate connected with said housing at a second end of said housing; and a frame plate connected with said extension rod and mounted with a frame of said press; and said arm attached with said housing.

16. A method for providing safety interlocking for presses, the steps comprising:

obtaining a press; and mounting one or more actuators onto a ram and a frame of said press; and biasing said actuators to move said ram towards a work material when not activated; and positioning and mounting an activating valve near an arm whereby said arm is capable of moving with said ram and said arm activates said activating valve when displaced a predetermined amount towards said work material; and connecting a first output port of a control valve to a first port of said activating valve and to a first input port of a piloted valve and a second output port of said control valve to said one or more actuators; and connecting an actuating port of said piloted valve to a second port of said activating valve and a second output port of said piloted valve to a stroke actuator of said press; and activating said second output port of said control valve; and deactivating said first output port of said control valve whereby said ram retracts; and placing a work material between said ram and frame; and deactivating said second output port of said control valve whereby said ram displaces toward said work material; and activating said first output port of said control valve whereby said stroke actuator is activated when said activating valve activates; and contacting said work material with said ram; and deactivating said first output port of said control valve; and activating said second output port of said control valve; and allowing said ram to displace away from said work material; and removing said work material.

17. The method for providing safety interlocking for presses as set forth in claim 16, the steps further comprising:

removing an object thicker than said work material from between said ram and said frame; and allowing said activating valve to activate due to sufficient displacement of said ram under said bias and removal of said thicker object.

18. The method for providing safety interlocking for presses as set forth in claim 16, whereby:

said valves are pneumatic valves; and supplying and operating said valves with compressed air; and venting said ports when deactivated; and supplying compressed air to said ports when activated.

19. The method for providing safety interlocking for presses as set forth in claim 17, whereby:

said valves are pneumatic valves; and supplying and operating said valves with compressed air; and venting said ports when deactivated; and supplying compressed air to said ports when activated.

* * * * *